United States Patent

Stein et al.

[11] Patent Number: 5,920,524
[45] Date of Patent: Jul. 6, 1999

[54] HYDROPHONE ARRANGEMENT AND BUNKER FOR HOUSING SAME

[75] Inventors: Peter J. Stein, Hollis; Steven Edmund Euerle, Nashua, both of N.H.

[73] Assignee: Scientific Solutions, Inc., Hollis, N.H.

[21] Appl. No.: 08/918,887

[22] Filed: Aug. 6, 1997

[51] Int. Cl.[6] ........................................ G01V 1/16
[52] U.S. Cl. .......................................... 367/188; 181/122
[58] Field of Search ................................. 367/129, 173, 367/188; 181/112, 122

[56] References Cited

U.S. PATENT DOCUMENTS

| | | | |
|---|---|---|---|
| 3,699,508 | 10/1972 | Massa | 367/176 |
| 3,980,985 | 9/1976 | Dale et al. | 367/173 |
| 4,692,906 | 9/1987 | Neeley | 367/173 |

OTHER PUBLICATIONS

"RD Instruments Workhouse Complete!", *Sea Technology*, Jan. 1997, n.p.
"Trawl—Resistant Bottom Mounts", *Flotation Technologies*, n.p.

*Primary Examiner*—Ian J. Lobo
*Attorney, Agent, or Firm*—Davis and Bujold

[57] ABSTRACT

A hydrophone arrangement, housed within a dome shaped concrete and steel bunker, to accurately establish a bearing of a target object while diminishing potential displacement of the hydrophone arrangement from an initial installed position. A plurality of hydrophones are centrally positioned within the bunker and equally spaced about a periphery of a steel cylindrical member so that each hydrophone receives acoustic energy in a time delay manner with respect to the other adjacent hydrophones so that a bearing determination may be made from information received by a single stand alone bunker. An acoustic horn may also be provided to focus the acoustic energy towards the hydrophones to improve the signal-to-noise ratios and provide control of the phase of the acoustic energy as the energy is received by the hydrophones.

22 Claims, 5 Drawing Sheets

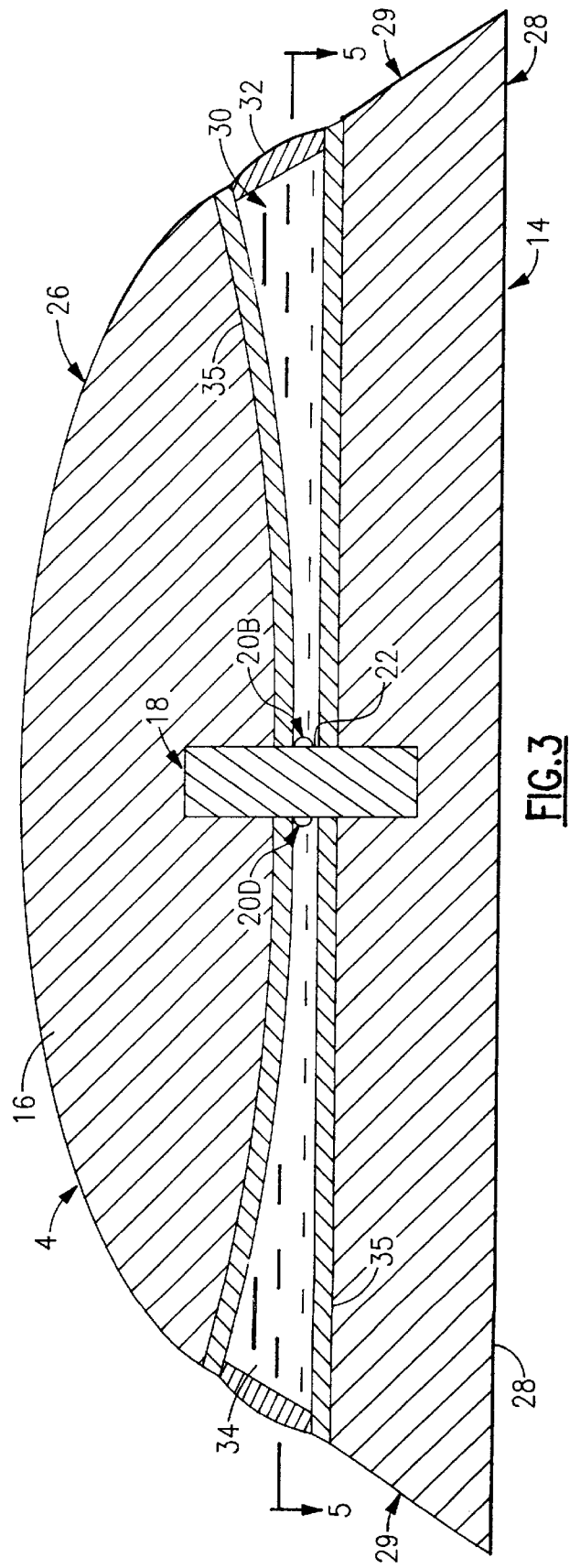
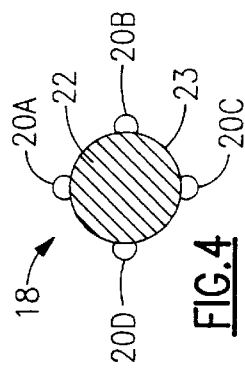
FIG. 3
FIG. 4

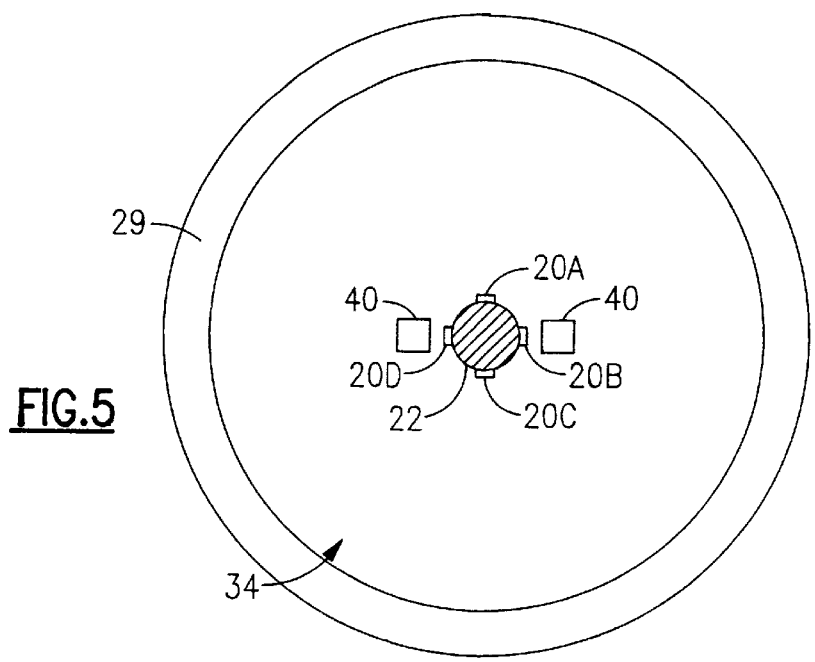
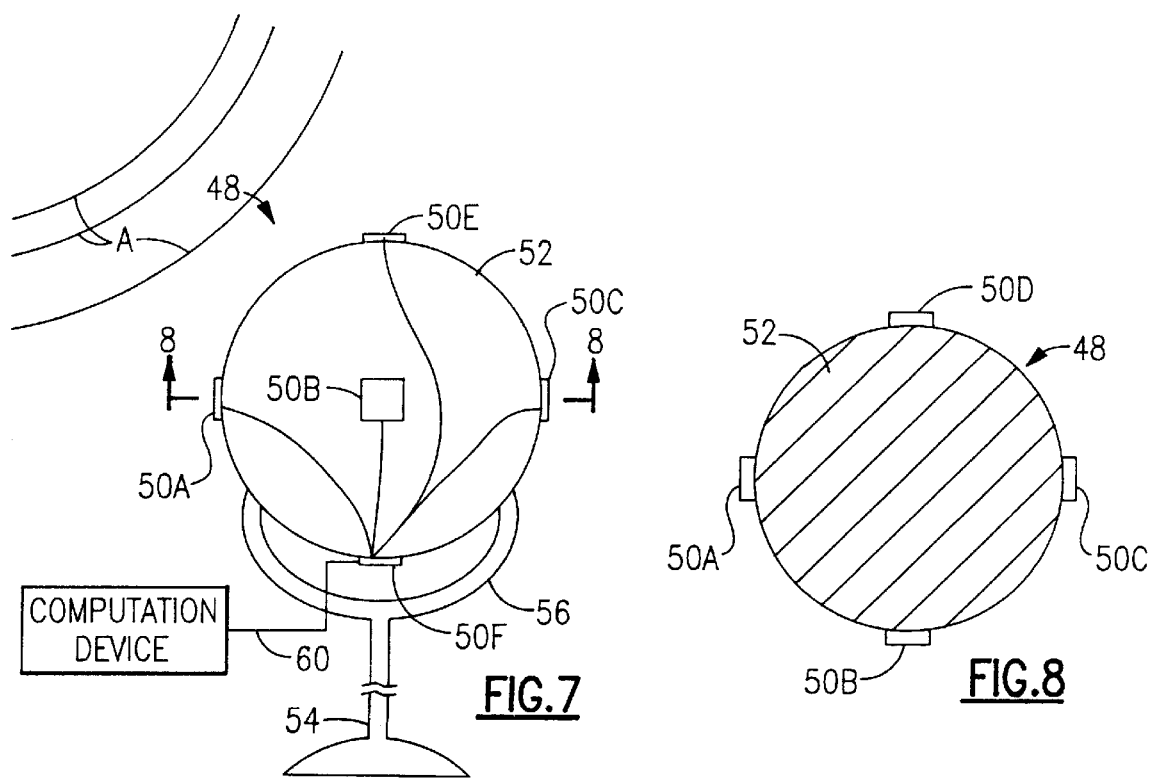

HYDROPHONE ARRANGEMENT AND BUNKER FOR HOUSING SAME

FIELD OF THE INVENTION

This invention relates generally to a hydrophone arrangement useful in determining the bearing and range of a target object relative to the hydrophone arrangement and to a stable underwater bunker for housing the same.

BACKGROUND OF THE INVENTION

The United States Navy is proposing to construct one or more permanent, shallow water, acoustic tracking ranges along the coastal seaboard of the United States for the purposes of providing a highly technological water and beach training facility. The range will possibly encompass a range area of approximately 25 by 20 nautical miles and will be located along the continental shelf in a water depth of about 100 to 1,300 feet with a longitudinal axis of the range area extending parallel to the coastline. Within the range area, a number of hydrophones will be permanently installed so that acoustic wave energy may be measured and converted to electrical signals in order to electronically effectuate, orchestrate and observe military training, related exercises and ordinance tests. The hydrophones are generally wired together and then to shore. The hyrdophones, along with their housings and integral electronics, are generally referred to as nodes. Movement of ships, troops, aircraft and ordinance, for example, may be monitored within the range from a centralized command and control compound thereby providing interested parties with the ability to record and make improvements to the training exercise from actual observed events.

One problem, however, is that the hydrophone nodes, which are to be permanently installed along the ocean floor, are subject not only to a high corrosivity salt water, immense hydrostatic pressures and powerful underwater currents, but also to commercial fishing activities that surround or extend into the range. Thus, the nodes must be able to operate effectively in a tumultuous and dynamic environment.

Particularly disruptive fishing activities that require attention are those that utilize bottom trawlers and seafood dredges. Not only do such activities create upheaval of the seabed floor along the shelf but they potentially serve to rearrange installed nodes if contact is made between the trawlers and the installed nodes. In order to alleviate some of those problems, it is proposed that cables interconnecting the nodes will be buried in approximately three feet (one meter) of sediment below the surface of the sea bed, as such depth has proven acceptable in other applications, e.g. the international telecommunication industry. However, the problem of contact between trawlers and nodes is still not alleviated since the hydrophone cannot be buried.

A further problem of effectively establishing an underwater electronic range is that in order to determine the location of coordinated target objects, such as ships, troops and aircraft, for example, a reference grid, such as range and bearing from a known location, must be established. Generally, underwater targets to be tracked are outfitted with transponders which regularly transmit acoustic signals (pings) which are received on one or more bottom mounted hydrophones (nodes). In the past, however, bearing determinations were calculated by a quasi-triangularization method from information obtained from three or more hydrophones located at known widely separated locations. Yet having multiple sets of three hydrophones distributed along the ocean floor increases economic burdens and complicates installation procedures for such a relatively small geographic range area. Therefore, a need exists to minimize the number of node installations on the ocean floor.

Especially for shallow water operations, where acoustic propagation distances are reduced, significant savings could be realized if the bearing of the transmitted acoustic signal (ping) could be determined accurately from a single co-located set of hydrophones. By co-located, the inventors mean separated by less than a few feet such that they would occupy the same node. However, the arrangement must be inexpensive and therefore cannot have too many (say no more than six) hydrophones. To provide any real advantage over present systems, the bearing accuracy must be on the order of 1 degree.

Yet it should be appreciated that acoustic waves travelling through water are subject to many undesirable characteristics not found in other medium, such as the atmosphere, and the range equipment is therefore continually receptive to improvements that enable obtaining more accurate and reliable information. One of the most influential, but undesirable effect, is unwanted noise and therefore a further need exists that increases the signal-to-noise ratios of acoustic energy travelling underwater. Another undesirable characteristic, especially in shallow water, is decorrelation of the signal due to multipath and scattering. This reduces the ability to decode information contained in the acoustic signal. In order to achieve 1 degree bearing accuracy, and create a low error rate underwater communications system, a system would have to have significant gains against these unwanted propagation characteristics of the ocean water.

A further problem of range determinations exists when making range calculations for target objects that are located in shallow water. As before, the prior art attempted to improve difficulties by increasing the number of hydrophone arrangements which, again, adds costs and installation burdens associated with a small, shallow water range.

OBJECTS AND SUMMARY OF THE INVENTION

Wherefore, it is an object of the present invention to overcome the aforementioned problems and drawbacks associated with the prior art designs.

Another object of the invention is to provide a nodes which is in effect a hydrophone bunker which will be able to withstand the forces generated by commercial fishing gear, without damage to the bunker structure, and will resist displacement from its initial position if contacted by such commercial fishing gear.

A further object of the invention is to insure that none of the exposed surfaces of the hydrophone bunker installation have any protrusions, openings, cavities, voids, etc. which can be engaged by commercial fishing gear so as to minimize the possibility of disturbance of the initial location of the hydrophone bunker/node installation.

Yet another object of the invention is to provide a limited number of hydrophone bunkers while still providing an accurate estimation of the target object location by having both the range and bearing (accurate to within 1 degree) determined using the signal arriving at only one node (bunker).

Still another object of the invention is to provide a novel signal processing system whereby the bearing of the object is determined by comparison to a set of measured normalization curves.

A still further object of the present invention is to supply the hydrophones with a mechanism for improving the signal-to-noise ratio of the incoming acoustic wave with respect to the water medium, and thereby improve the accuracy of the bearing and/or the range estimation of the target object location.

A still further object of the present invention is to increase the coherence (clarity) of the received signal relative to the transmitted signal by rejecting multipath and scattering.

A concomitant object of the invention is to manufacture the hydrophone bunker installation from a combination of steel and concrete to render the bunker more resistant to being disturbed by commercial fishing gear and to form a 360° horizontally arranged acoustic horn within the hydrophone bunker to improve the reception of acoustic waves.

A further concomitant object of the invention is to provide a relatively low cost hydrophone bunker which provides accurate tracking of a desired target object located within the range.

These and other objects are accomplished by an underwater hydrophone bunker arrangement that effectively uses its heavy weight and domed shape to prevent unwanted displacement from underwater currents and from commercial fishing trawls and dredges.

The underwater bunker also uniquely utilizes its concrete and steel constituency, domed shape and internal components to provide a signal conditioning ability that enables the bunker to receive an acoustic wave by a plurality of hydrophones, each receiving the wave at discrete time intervals, so that information comparisons, between each hydrophone and between normalization curves, can be made in order to effectively determine bearing to within one degree.

The ability of the bunker to provide discrete time interval reception between each hydrophone is accomplished in that an incoming acoustic wave impacts the bunker and skirts or wraps around the substantially impermeable concrete/steel structure so that wave energy will be received by a first hydrophone, which is physically closest to the area of the bunker where the wave first impacted, and thence by a second hydrophone, which is the next closest hydrophone, to the wave impact area, and so on until all of the installed hydrophones receive wave energy and thence a comparison calculation can be made. All calculations are made using information from a singular bunker site and are made independently without having to rely on one or more additional bunker sites, as normally occurs with traditional triangularization methods.

The hydrophone bunker also provides an acoustic horn that improves the signal-to-noise ratio of the received acoustic wave, as the wave energy travels to the hydrophones, so as to eliminate interference from unwanted noise and improve the accuracy of the received energy information. The horn also acts to remove scattered signals thereby increasing the coherence of the signal and the ability to decode information contained in the signal.

BRIEF DESCRIPTION OF THE DRAWINGS

The invention will now be described, by way of example, with reference to the accompanying drawings in which:

FIG. 3 is a diagrammatic cross-sectional view of one embodiment of a hydrophone bunker arrangement according to the present invention;

FIG. 4 is a partial top view of the hydrophone arrangement of FIG. 3;

FIG. 5 is a diagrammatic cross-sectional view of the hydrophone arrangement along section line 5—5 of FIG. 3;

FIG. 7 is a diagrammatic front elevational representation of a modification of the hydrophone arrangement according to the present invention; and FIG. 8 is a cross-sectional view along section line 8—8 of FIG. 7.

DESCRIPTION OF THE PREFERRED EMBODIMENTS

Figure 1:
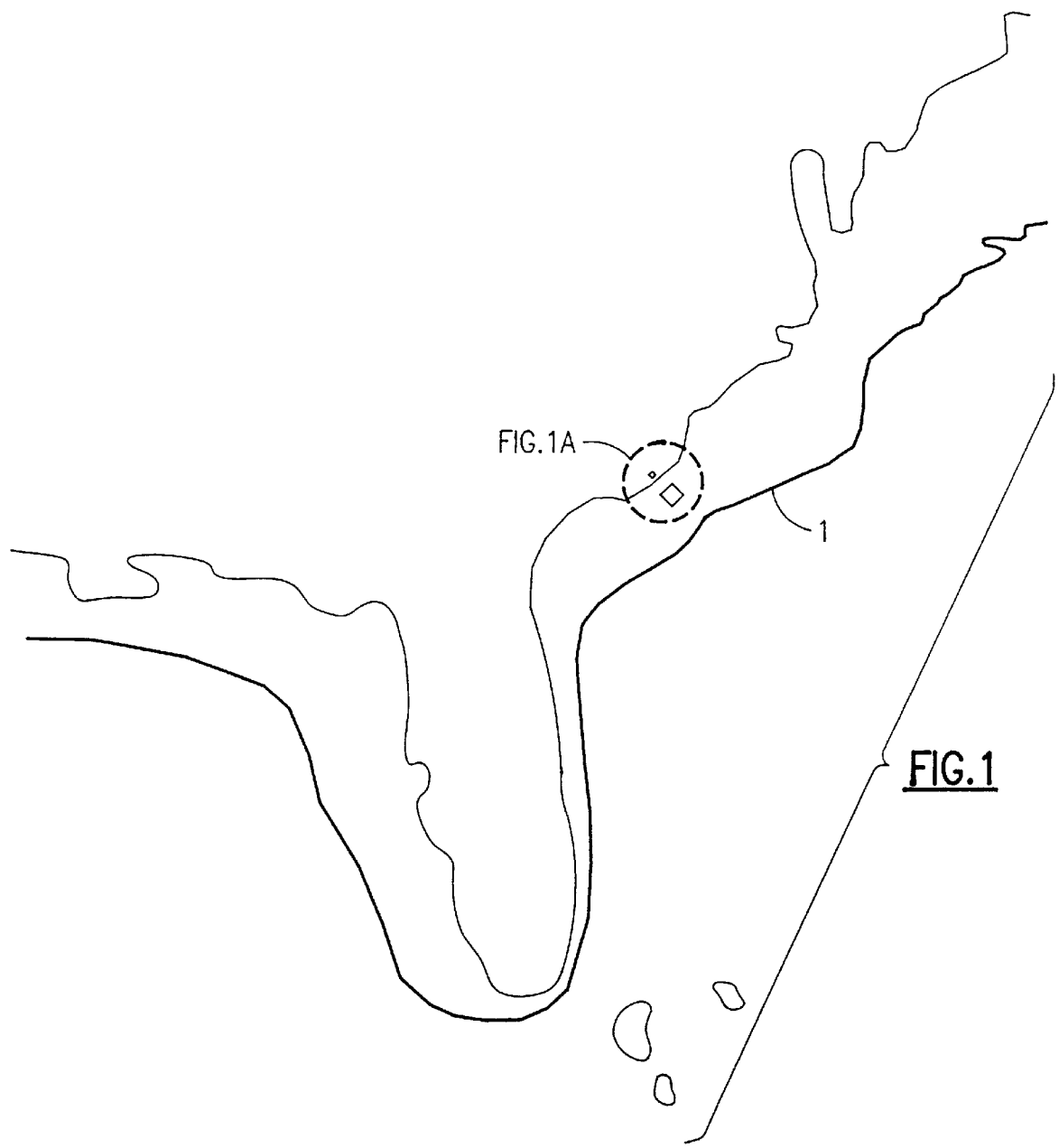
FIG. 1 is a diagrammatic geographical representation of one of the proposed underwater ranges.
Figure 1A:
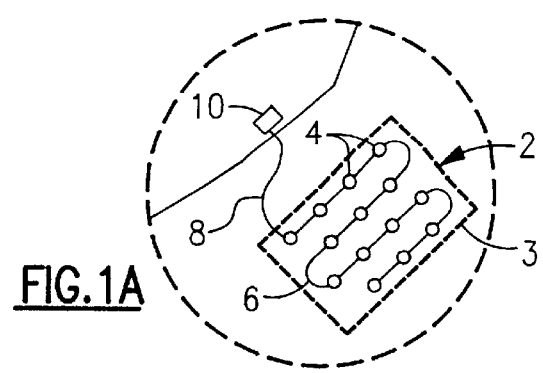

With reference to FIG. 1, a geographical representation of a proposed range 2 is shown. Located along the continental shelf 1, the range 2 is defined by an imaginary border, shown by dashed lines 3, and includes a plurality of hydrophone bunker installations 4. Each one of the hydrophone bunkers 4 is connected to at least one other hydrophone bunker 4 by cable 6. In addition, one of the hydrophone bunkers 4 located adjacent the shoreline, at the beginning of the cable connection, is connected by a shore cable 8 to a control facility 10 which receives information generated by the hydrophone bunker 4 so as to allow central signal processing and monitoring of the activities which occur within range 2.

Figure 2:
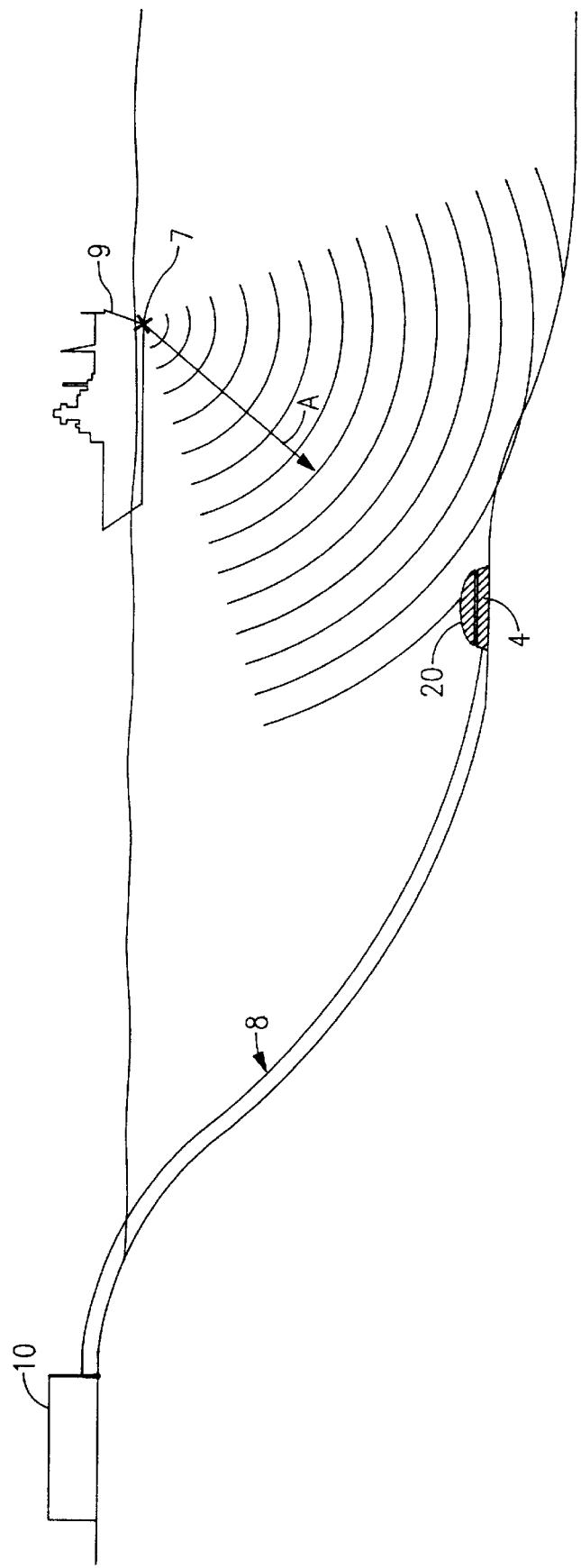
FIG. 2 is a diagrammatic partial cross-sectional representation of the enlarged proposed underwater range of FIG. 1.

With reference to FIG. 2, operation of the range, in general, is such that a hydrophone bunker 4 receives acoustic wave energy A from an acoustic source, such as from an installed transmitter 7 on a floating or submerged vehicle 9, and processes the wave energy amongst a plurality of centrally located hydrophones 20. Each one of the hydrophones 20 is coupled to the cable 6. The received wave energy information is then transmitted to control facility 10 via cables 6, 8 and centralized determinations are made as to the range and bearing of floating or submerged vehicle 9 relative to that bunker. Further bearing determinations are made in a similar manner with respect to other target objects located within the range 2.

As the present invention relates specifically to the hydrophone bunker as well as to the hydrophone arrangement therein but does not relate to the control facility 10 per se, or the cabling 6, 8, a further detailed discussion will not be provided with respect to the connections between individual bunkers and the control facility since the remaining aspects are well known to those skilled in that art and do not warrant further description.

With reference to FIGS. 3 to 5, a detailed description of the hydrophone bunker housing 4, according to the present invention, will now be provided. As can be seen in those Figures, the hydrophone bunker 4, comprises a base portion 14 and a domed roof portion 16. A hydrophone pickup arrangement, generally indicated as element 18, is centrally located between the base and roof portions 14, 16. The hydrophone pickup arrangement 18 comprises a solid, steel cylinder 22 which interconnects the base portion 14 with the roof portion 16. The outer circumference 23 of the solid steel cylinder 22 supports a plurality of spaced apart hydrophones 20A–20D. In this embodiment, four equally spaced hydrophones 20A, 20B, 20C and 20D are arranged in a horizontal plane which extends parallel to bottom surface 28 of base portion 14. The four hydrophones 20A–20D are each located internally of the bunker 4 and connected to the control facility 10 via cables 6 and 8; and associated signal conditioning electronics (e.g. amplifiers, analog-to-digital converters, etc.). The arrangement of internal connections and conditioning electronics are conventional communication lines for the conveyance of the received information from the hydrophones and are well known within the art and are thus not shown or described in further detail herein.

It should be apparent to those skilled in the art that the number and arrangement of hydrophones 20, while described as being located around a steel cylinder and as being four (4) in number, may be varied from application to application. As will be illustrated later, it is only important that the arrangement allow for a time delay pickup of acoustic energy as between the installed hydrophones 20A–20D.

The roof portion 16 has a domed exterior surface 26 while the base portion 14 has a flat bottom surface 28 and a domed exterior side surface 29. An acoustic horn 30 is formed between the base portion 14 and the roof portion 16. Both the top and bottom inwardly facing surfaces of the horn typically comprise 2 inch thick layer of steel 35. It is to be appreciated that the thickness of the steel layer can vary from application to application. The acoustic horn 30 extends 36° around the perimeter of the bunker 4 so that an acoustic wave A, for example being propagated outward from a transponder 7 of a floating or submerge vehicle 9, can enter the acoustic horn 30 and be sensed by the hydrophone pickup arrangement 18.

A desired fluid 34 may be housed within the acoustic horn 30 and the fluid 34 is maintained within bunker 4 by a circumferential shield 32 which is sealed with respect to both the domed exterior surface of the base and the roof portions 14, 16 to prevent the fluid 34 from escaping from the acoustic horn 30. The exterior surface of the circumferential shield 32 provides a smooth transition between the domed exterior side surface 29 of the base portion 14 and the domed exterior surface 26 of the roof portion 16 to minimize the possibility of any commercial fishing gear getting caught, hooked or latching onto the bunker 4 and displacing the bunker 4 from its set initial installed location. The shield is transparent to the acoustic wave, yet strong enough to withstand an impact from fishing gear and anchors, for example.

The fluid 34 is preferably an acoustically transparent, electrically insulating fluid such as castor oil. It is to be appreciated that a variety of other fluids, having similar characteristics, would also work and be readily apparent to one skilled in the art.

The solid steel cylinder 22 is mounted at the center of the symmetric acoustic horn and the four hydrophones 20A–20D are flush mounted about the periphery of the solid steel cylinder 22. Preferably the bunker 4 is encased in concrete and manipulated to form the domed exterior hemispherical shape, which can be seen in FIGS. 2 and 3, comprising the domed exterior side surface 29 of the base portion 14 and the domed exterior surface 26 of the roof portion 16. It should be appreciated that the exterior shape of the bunker 4 combined with its relatively heavy concrete mass, e.g. weighing approximately 5,000 pounds, are features sufficient to minimize the possibility of the bunker 4 being disturbed when engaged by fishing gear inadvertently contacting the installed bunker 4.

The bunker of FIGS. 3–5 is substantially partially spherical in shape and has a diameter of approximately six feet and a height of approximately two feet. The acoustic horn has an outer perimeter width of approximately 5 inches while having an inner perimeter width, adjacent the hydrophone arrangement 18, of approximately 0.5 inches. The lower surface of the acoustical horn is preferably planar while the top surface of the acoustical horn is preferably slight elliptical, parabolic, or hyperbolic in shape. The horn and lower plate were 2 inch thick steel with welded rebar to attach the concrete. The bunker 4 has an overall weight typically ranging from about 2,000 to 20,000 pounds, more preferably about 3,000 to about 12,000 pounds and is designed to receive and accurately process signals having a frequency range of from about 13 kHz to about 37 kHz. It is to be appreciated by one skill in this art that variations in the size, shape, weight and/or material of the device can be made so that the device will suitably operate over different frequency ranges or in air.

Figure 6:
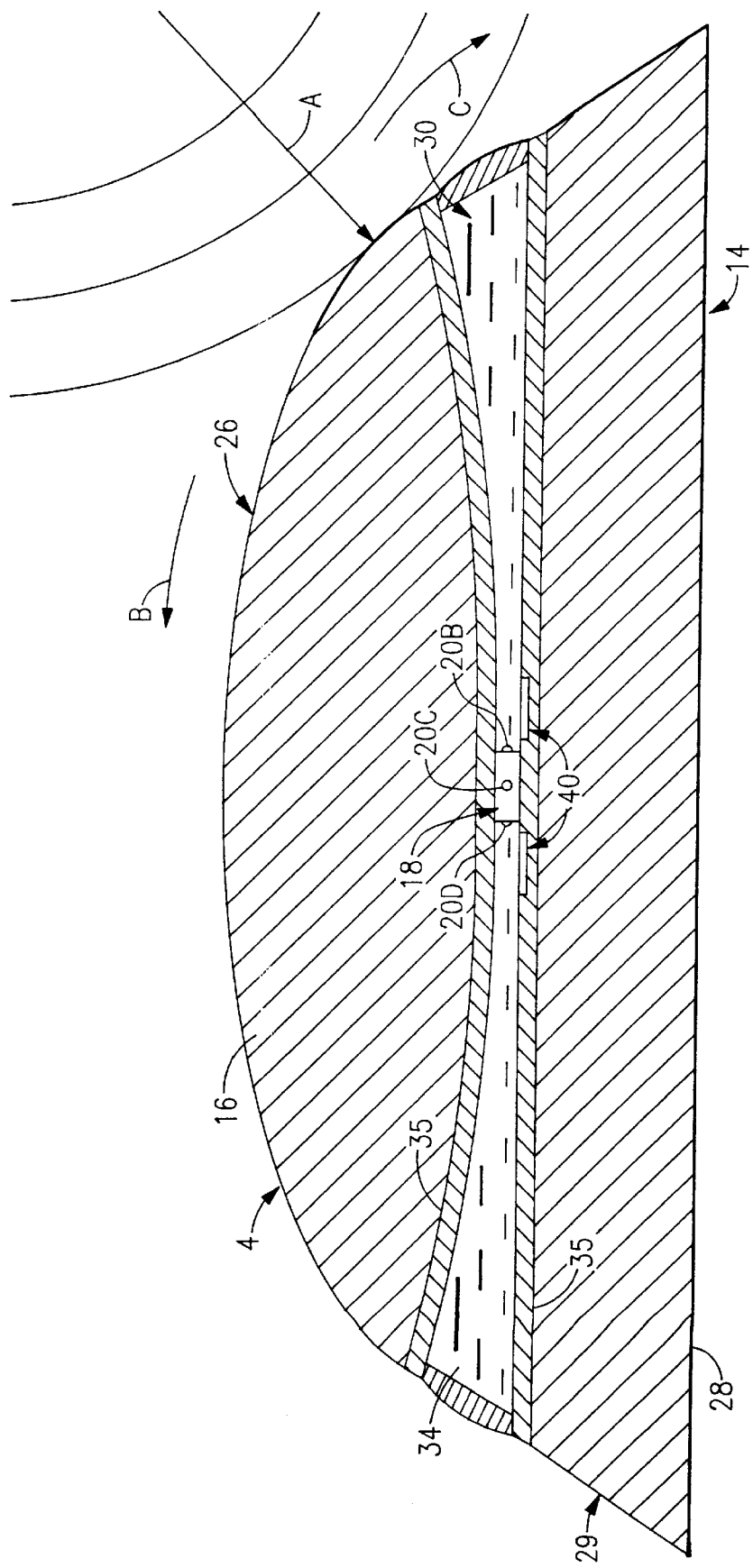
FIG. 6 is a diagrammatic representation of an acoustic energy wavefront contacting the hydrophone bunker of the present invention.

A detailed description of the novel signal processing system of the present invention is now provided with reference to FIG. 6. As acoustic wave energy A is received at bunker 4 along the domed roof portion 16, the wave energy is reflected/refracted by bunker 4 and propagated around bunker 4 in all directions. Such propagated wave energy skirts or wraps around the outside of the domed roof 16, as indicated by arrows B and C, and accordingly becomes propagated into the acoustic horn 30.

As the acoustic wavefront continues to propagate, the wave energy will first be received by hydrophone 20B, as that hydrophone is the closest in proximity to the received wavefront A, and thence by hydrophones 20C and 20A, as those hydrophones are the next closest, and finally by hydrophone 20D. It should be appreciated that the circular arrangement of hydrophones around the circumference 23 of cylinder 22 provides a mechanism whereby wave A will wrap itself around the cylinder so that each hydrophone 20 receives energy at slightly different time intervals.

The different time intervals then allow the bearing of the object target, emitting the received wavefront A, to be calculated relative to the bunker 4. Such calculation is determined by computing the interchannel phase delay of the acoustic signal as between the separate hydrophones 20A–20D. Calibration curves for each bunker 4, which have been previously developed during testing at the time of installation of the bunker and describe the relationship between the computed phase delays and the bearing angle, are then utilized to compare the phase delay to arrive at a bearing estimation of the target object which emitted the acoustic energy. Those skilled in the art will appreciate that the calibration curves which are used in determining bearing are the interchannel frequency responses which gives the relative magnitudes and phase between the sensors.

In the preferred embodiment, the calibration curves, which are compared with phase delays from signals with unknown bearing to arrive at a bearing estimate, are computed by performing the following procedure on each incoming signal. First, the incoming signal is detected in time using correlation or rms threshold.

Secondly, the data received from step one is windowed.

Finally, a 4×4 cross spectral density matrix is computed, whereby the diagonals of the matrix represent the autospectra or power spectra, and the off diagonal terms represent the cross spectral density between two sensors.

The power spectra and the individual cross spectral densities are then used to compute a 3×3 frequency response matrix. The terms from the frequency response matrix are stored for each signal which results in a curve of frequency response versus azimuthal angle, where the azimuthal angle is measured from a rotator controller or determined by an independent tracking of the transmitter (such as GPS or microwave track of a surface ship on which the transmitter is mounted). The phase of the frequency response matrix represents the phase delay between hydrophone pairs. The magnitude of the frequency response matrix represents the relative amplitudes of the various hydrophone combinations and is used to estimate the target bearing angle by using a least square algorithm. The estimate computed by using the magnitude of the frequency response is then used as a starting point and the bearing estimate is refined using the phase of the frequency response.

The aforementioned steps are repeated for each ping thereby providing a calculated frequency response matrix for each individual ping. The result is then compared to the stored calibration curve by finding the azimuthal angle which minimizes the rms error between the computed frequency response of the track ping and the stored calibration values.

Although the illustrative embodiment described above implements correlation or rms threshold to detect an incoming signal, it will be appreciated by one of ordinary skill in the art that various other method or techniques may be employed to determine the same.

Although the illustrative embodiment described above implements the aforementioned steps to acquire calibration curves, it will be appreciated by one of ordinary skill in the art that other methods, such as triangularization, may be implemented.

While the foregoing signal processing illustration is simplified, those skilled in the art should understand that it is the wrap around feature presented by the hydrophone arrangement that enables bearing determinations to be made without requiring additional information from one or more other bunkers. It should be further appreciated, by those skilled in the art, that the function of the acoustic horn 30 is to: 1) focus the acoustic field; 2) increase the signal-to-noise ratio against the surface noise; 3) control the phase of the acoustic wave passing into the cylinder; and 4) and reject multipath and scattered signals. This phase control and signal-to-noise ratio permits bearing determinations to within one degree of accuracy. Due to the utilization of the acoustic horn 30, the phase becomes independent of the depression/elevation angle of the incoming acoustic signal thereby removing significant error. The acoustic horn 30 also provides an acoustic path to the hydrophones 20A–20D which is void of nearby scatters that might corrupt or otherwise interfere with the phase measurement.

In addition, bunker 4 has at least one flush mounted transmitter 40, preferably four transmitters, for the purposes of actively transmitting acoustic energy towards a target object. The transmitter 40 may also be utilized as a communication device to send information to a target object within range 2. By having transmitters placed around the cylinder, and located within the horn, the transmit signal sent toward the target is amplified. This improves signal reception at the target and lowers the chance of interference with other signals.

Alternatively, as can be seen in FIG. 7 and 8, a second version of the hydrophone arrangement 48 comprises a plurality of hydrophones, e.g. six (6) hydrophones 50A–50F, equally spaced about a solid mass in the shape of a sphere 52. It is contemplated the sphere will be manufactured from steel or some other dense, heavy mass material. The sphere 52 can be suspended or supported by a support mechanism, such as pole 54 having a y-shaped bracket 56 which supports a base of the sphere 52. The six (6) hydrophones 50A–50F are each electrically connected to a control and computation device 58 via cable 60. When an acoustic wave impinges upon the hydrophone arrangement 48, the device is able to determine, to within about one (1) degree or so, the precise bearing of an object emitting the acoustic wave A relative to the hydrophone arrangement 48. A detailed description concerning the processing of a wavefront, by the hydrophone arrangement 48 in accordance with the present invention, is similar to that discussed above and is thus not again described.

It is to be appreciated that the hydrophone arrangement, according to the present invention, can be used in a variety of different applications and may be used in combination with the previously discussed acoustical horn. An important aspect of the present invention is the wrap around feature of the hydrophone arrangement and the use of a plurality of hydrophones to determine the bearing of an emitted sound relative thereto.

It is contemplated and should be further appreciated that the hydrophone arrangement 18, 48 herein described may also find utility as a stand alone bearing determinator in other acoustic transmission medium, such as the atmosphere. A hydrophone detects acoustic pressure in the water whereas a microphone detects acoustic pressure in the atmosphere. Accordingly, the hydrophone/microphone arrangement 18, 48 may also be used to determine the bearing direction of an unknown sniper who is discharging a firearm or the bearing direction of any unknown target that transmits, or in some way emits, acoustic energy.

One suitable hydrophone, for use in the present invention, is a flexural disc hyrodphone manufactured by Sparton Electronics of Deleon Spring, Fla. A suitable transmitter, for use in the present invention, is a tonepilz transmitter sold by International Transducer Corporation of Goleta, Calif. In addition, the hydrophones must be able to sense frequencies ranging from about 3 kHz to about 37 kHz in order to function properly with the current U.S. Navy transponders.

Since certain other changes may be made in the above described invention without departing from the spirit and scope as herein claimed, it is intended that all of the subject matter of the above description or shown in the accompanying drawings shall be interpreted merely as examples illustrating the inventive concept and shall not be construed as limiting the invention.

What is claimed is:

1. A hydrophone arrangement, for determining a bearing of a target object relative to said hydrophone arrangement said hydrophone arrangement comprising:

a central solid mass support member supporting a plurality of hydrophones about an exterior periphery of said solid mass support member, each of said plurality of hydrophones being directly exposed to a transmission medium, and each of said plurality of hydrophones being located about the exterior periphery of said solid mass such that, during operation, each hydrophone is able to receive directly acoustic energy propagating through the transmission medium in a time delayed manner thereby providing a mechanism for said hydrophone arrangement to supply information to calculate the bearing of said target object solely by acoustic energy received by said hydrophone arrangement;

wherein said hydrophone arrangement is housed within a bunker which has a roof portion and a base portion, and said plurality of hydrophones are located between said roof and base portions so that, during operation, each of said plurality of hydrophones is directly exposed to the transmission medium and is able to receive directly acoustic energy propagating through the transmission medium; and said hydrophone, upon directly receiving the acoustic energy propagating through the transmission medium, calculates both the bearing and the distance of said target object relative to said hydrophone arrangement.

2. A hydrophone arrangement according to claim 1, wherein said roof portion is substantially hemispherical in shape to minimize, during use, displacement of said bunker from an initial installed position.

3. A hydrophone arrangement according to claim 1, wherein said roof and base portions are both manufactured substantially from a combination of concrete and steel.

4. A hydrophone arrangement according to claim 1, wherein said solid mass support member is a solid steel cylindrical member interconnecting said roof portion with said base portion and said plurality of hydrophones are equally spaced around the external periphery of said steel cylindrical member.

5. A hydrophone arrangement according to claim 4, wherein there are four equally spaced hydrophones supported by the external periphery of said steel cylindrical member.

6. A hydrophone arrangement according to claim 1, wherein said roof portion is spaced from said base portion by a solid steel cylindrical member so as to define an acoustic horn therebetween for controlling a phase of the acoustic energy as the acoustic energy enters said bunker and contacts said solid steel cylindrical member.

7. A hydrophone arrangement according to claim 6, wherein said acoustic horn extends 360° about the periphery of said bunker and is located between said roof portion and said base portion.

8. A hydrophone arrangement according to claim 6, wherein a circumferential shield covers said acoustic horn and provides a smooth transition between an exterior surface of said base portion with an exterior surface of said roof portion thereby forming a smooth exterior surface of said bunker.

9. A hydrophone arrangement according to claim 7, wherein said circumferential shield is sealed with respect to both said roof portion and said base portion and retains a fluid within said acoustic horn to prevent contamination of said acoustic horn by the surrounding environment.

10. A hydrophone arrangement according to claim 9, wherein said fluid is an acoustically transparent and electrically insulating fluid.

11. A hydrophone arrangement according to claim 9, wherein said fluid is castor oil.

12. A hydrophone arrangement according to claim 5, wherein said bunker has a substantially flat base surface and has a total weight of between about 2,000 pounds and about 20,000 pounds.

13. A hydrophone arrangement according to claim 2, wherein said bunker includes at least one transmitter, coupled to a control cable, for transmitting a signal from said bunker to a desired target object.

14. A plurality of hydrophone arrangements, installed to define a range, for determining a bearing of a target object relative to one of the plurality of hydrophone arrangements located within the range, and each of said plurality of hydrophone arrangements comprising:

a central solid mass support member supporting a plurality of hydrophones about an exterior periphery of said solid mass support member, and each of said plurality of hydrophones being directly exposed to a transmission medium so that, during operation each of said plurality of hydrophones is able to receive acoustic energy propagating through the transmission medium in a time delayed manner thereby providing a mechanism for said hydrophone arrangement to supply information to calculate both the bearing and the distance of said target object relative to said hydrophone arrangement solely by the acoustic energy received by said hydrophone arrangement; and each said hydrophone arrangement being housed within a bunker which has a roof portion spaced from a base portion, and said plurality of hydrophones being located between said roof and base portions so that, during operation, each of said plurality of hydrophones is able to receive acoustic energy propagating through a transmission medium.

15. A plurality of hydrophone arrangements according to claim 14, wherein said roof portion is substantially hemispherical in shape to minimize, during use, displacement of said bunker from an initial installed position; and said roof portion and said base portion are both manufactured substantially from a combination of concrete and steel.

16. A plurality of hydrophone arrangements according to claim 14, wherein said support member is a solid steel cylindrical member which interconnects said roof portion with said base portion and said plurality of hydrophones are equally spaced around an external periphery of said solid steel cylindrical member.

17. A plurality of hydrophone arrangements according to claim 14, wherein said roof portion is spaced from said base portion by said steel cylindrical member so as to define an acoustic horn therebetween for controlling a phase of the acoustic energy as the acoustic energy enters said bunker and contacts said solid steel cylindrical member.

18. A plurality of hydrophone arrangements according to claim 17, wherein said acoustic horn extends 360° about the periphery of said bunker and is located between said roof portion and said base portion.

19. A plurality of hydrophone arrangements according to claim 17, wherein a circumferential shield covers said acoustic horn and provides a smooth transition between an exterior surface of said base portion with an exterior surface of said roof portion thereby forming a smooth exterior surface of said bunker.

20. A plurality of hydrophone arrangements according to claim 17, wherein said circumferential shield is sealed with respect to both said roof portion and said base portion and retains a fluid within said acoustic horn to prevent contamination of said acoustic horn by the surrounding environment.

21. A method of calculating a bearing of a target object by acoustic energy received by a hydrophone arrangement, said method comprising the steps of:

supporting said hydrophone arrangement, comprising a plurality of hydrophones, on an external periphery of a central solid mass support member;

housing said solid mass support member within a bunker which has a roof portion and a base portion with said plurality of hydrophones being located between said roof portion and said base portion and being directly exposed to a transmission medium so that, during operation, each of said plurality of hydrophones is able to receive directly acoustic energy propagating through a transmission medium;

installing a plurality of bunkers, each having a hydrophone arrangement with a plurality of hydrophones, to define a range for determining the bearing of a target object relative to at least one of said bunkers located within the range;

receiving, via said plurality of hydrophones of at least one of said hydrophone arrangements, acoustic energy propagating through a transmission medium in a time delayed manner; and calculating, from the received acoustic energy, both the bearing and the distance of said target object relative to said bunker receiving the acoustic energy solely by the acoustic energy received by said at least one hydrophone arrangement.

22. A hydrophone arrangement, for determining a bearing of a target object relative to said hydrophone arrangement, in combination with a bunker, said hydrophone arrangement comprising:
  a central solid mass support member supporting a plurality of hydrophones about an exterior periphery of said solid mass support member, and each of said plurality of hydrophones being located about the exterior periphery of said solid mass and being directly exposed to a transmission medium such that, during operation, each of said hydrophones is able to receive acoustic energy, propagating through the transmission medium, in a time delayed manner thereby providing a mechanism for said hydrophone arrangement to generate information to calculate both the bearing and the distance of said target object, relative to the hydrophone arrangement, solely by the acoustic energy received by said hydrophone arrangement; and said bunker having a roof portion and a base portion being spaced from one another by the solid mass support member to define an acoustical horn therebetween, and said hydrophone arrangement being located within the acoustical horn, between the roof portion and the base portion, and being exposed to the transmission medium located within the acoustic horn.

\* \* \* \* \*

UNITED STATES PATENT AND TRADEMARK OFFICE
CERTIFICATE OF CORRECTION

PATENT NO.  : 5,920,524
DATED       : July 6, 1999
INVENTOR(S) : Peter J. STEIN and Steven Edmund EUERLE It is certified that error appears in the above-identified patent and that said Letters Patent is hereby corrected as shown below:

Column 5, line 22, replace "36°" with "360°"

Signed and Sealed this

Thirtieth Day of November, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,920,524

DATED : July 6, 1999

INVENTOR(S) : Peter J. STEIN and Steven Edmund EUERLE

It is certified that error appears in the above-identified patent and that said Letters Patent is hereby corrected as shown below:

Column 1, line 9, after "the same." and before "BACKGROUND OF THE INVENTION", insert --This invention was made with Government support under contract No. N66604-95-D-E373-0057 awarded by The Naval Undersea Warfare Center, Division Newport. The Government has certain rights in this invention.--

Signed and Sealed this

Eleventh Day of April, 2000

Attest:

Attesting Officer

Q. TODD DICKINSON

Director of Patents and Trademarks